(12) United States Patent
Adachi (10) Patent No.: US 9,240,208 B2
(45) Date of Patent: Jan. 19, 2016

(54) RECORDING APPARATUS WITH MASTERING FUNCTION

(71) Applicant: TEAC Corporation, Tama-shi, Tokyo (JP)

(72) Inventor: Shigeyuki Adachi, Tachikawa (JP)

(73) Assignee: TEAC Corporation, Tama-shi, Tokyo (JP)

( * ) Notice: Subject to any disclaimer, the term of this patent is extended or adjusted under 35 U.S.C. 154(b) by 0 days.

(21) Appl. No.: 13/748,414

(22) Filed: Jan. 23, 2013

(65) Prior Publication Data

US 2014/0098651 A1 Apr. 10, 2014

(30) Foreign Application Priority Data

Oct. 10, 2012 (JP) ................................. 2012-225516

(51) Int. Cl.
*G11B 20/10* (2006.01)

(52) U.S. Cl.
CPC .... *G11B 20/10527* (2013.01); *G11B 20/10314* (2013.01); *G11B 2020/10555* (2013.01); *G11B 2020/10574* (2013.01)

(58) Field of Classification Search
CPC ............. H04R 2225/67; H04R 25/356; H04R 25/502; H04R 25/70; G11B 20/00007; G11B 2020/00014; G11B 2020/00028; G11B 2020/00036; G11B 2020/00021; G11B 2020/10574; G11B 20/10527; G01D 3/022
See application file for complete search history.

(56) References Cited

U.S. PATENT DOCUMENTS

| | | | | |
|---|---|---|---|---|
| 4,080,528 A | * | 3/1978 | Kao et al. | 235/449 |
| 4,442,546 A | * | 4/1984 | Ishigaki | 455/72 |
| 5,508,855 A | * | 4/1996 | Hutchins et al. | G11B 5/09 327/355 |
| 5,956,196 A | * | 9/1999 | Hull et al. | G11B 5/012 360/65 |
| 6,925,340 B1 | * | 8/2005 | Suito et al. | 700/94 |
| 7,813,931 B2 | * | 10/2010 | Hetherington et al. | 704/500 |
| 8,352,052 B1 | * | 1/2013 | Green et al. | 700/94 |
| 8,867,750 B2 | | 10/2014 | Brown | |
| 2002/0057808 A1 | * | 5/2002 | Goldstein | H04R 25/356 381/106 |
| 2004/0213420 A1 | * | 10/2004 | Gundry et al. | 381/104 |
| 2009/0074209 A1 | | 3/2009 | Thompson et al. | |
| 2010/0070283 A1 | * | 3/2010 | Kato et al. | 704/278 |

(Continued)

FOREIGN PATENT DOCUMENTS

| | | |
|---|---|---|
| CN | 101641965 A | 2/2010 |
| CN | 102246544 A | 11/2011 |

(Continued)

OTHER PUBLICATIONS

Chinese Office Action dated Mar. 9, 2015, for corresponding CN Application No. 201310467149.6, 7 pages.

*Primary Examiner* — Dionne Pendleton
(74) *Attorney, Agent, or Firm* — Seed IP Law Group PLLC (57) ABSTRACT

There is provided a recording apparatus which can effectively execute compression processing regardless of the mixdown level, and which can thereby carry out the mastering process easily. A DSP mixes down audio signals assigned to a plurality of tracks into a stereo audio signal. When performing the mastering process, the DSP uses a peak value detected during the mixdown to adjust a threshold value for the compression processing, and carries out the compression processing using the adjusted threshold value. Subsequently, the DSP performs normalization processing so as to produce a master data, and records the master data in a recorder.

8 Claims, 7 Drawing Sheets

(56) References Cited

U.S. PATENT DOCUMENTS

| | | |
|---|---|---|
| 2010/0086149 A1 | 4/2010 | Kuroda et al. |
| 2010/0254546 A1* | 10/2010 | Hosomi ........... G11B 20/10009 381/106 |
| 2011/0054648 A1* | 3/2011 | Maxwell et al. ................ 700/94 |
| 2011/0129091 A1* | 6/2011 | Kron ............................... 381/17 |
| 2011/0243338 A1 | 10/2011 | Brown |
| 2012/0093343 A1* | 4/2012 | Batchelder et al. ........... 381/119 |
| 2012/0191462 A1 | 7/2012 | Aoki et al. |
| 2012/0213375 A1* | 8/2012 | Mahabub et al. ............... 381/17 |
| 2013/0054251 A1* | 2/2013 | Eppolito ....................... 704/500 |
| 2014/0039891 A1* | 2/2014 | Sodeifi et al. ................. 704/246 |

FOREIGN PATENT DOCUMENTS

| | | |
|---|---|---|
| CN | 102610229 A | 7/2012 |
| JP | 2011530843 A | 12/2011 |
| WO | 2010015275 A1 | 2/2010 |

* cited by examiner

RECORDING APPARATUS WITH MASTERING FUNCTION

PRIORITY INFORMATION

This application claims priority to Japanese Patent Application No. 2012-225516, filed on Oct. 10, 2012, which is incorporated herein by reference in its entirety.

TECHNICAL FIELD

The present invention relates to a recording apparatus such as a multi-track recorder which records audio signals on a plurality of tracks.

BACKGROUND ART

A multi-track recorder for recording audio signals on a plurality of tracks is conventionally known. By means of a multi-track recorder, it is possible to record, for example, a rhythm guitar part on track 1 and a lead guitar part on track 2 using electric guitars, and to further record a vocal part on track 3 using an integrated microphone, and then mix down these parts to generate and record a stereo signal.

JP 2011-530843 A includes disclosure concerning an automatic mastering function of a multi-channel sound system. JP 2011-530843 A describes adjusting channel faders to a uniform value, limiting at least two channels to a uniform output level, limiting each of the other channels to a decibel output level value lower than the uniform output level value of the two channels, and further adjusting a parameter value of at least one of the channel fader, threshold, release, and output level, to thereby carry out further compression and/or limiting of the encoded channels.

In a multi-track recorder, mixdown is normally performed at as high a level as possible without generating distortion, and subsequently a mastering process is performed to complete recording. The mastering process includes executing sound quality correction (equalizer processing), processing for increasing sound pressure (compression processing), and processing for adjusting to a designated level (normalization). Without a certain degree of knowledge and experience, it is difficult for one to obtain desired results from the mastering process. In particular, in the compression processing for increasing sound pressure, threshold and ratio adjustments are relatively difficult. For this reason, there has been proposed a configuration in which several presets are provided for each type of music and a user selects a desired preset from among these presets. However, such a configuration is disadvantageous in that presets may not be effective when the mixdown is not carried out at an appropriate recording level.

Figure 5A:
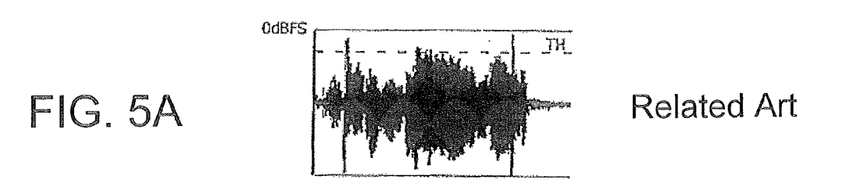
FIG. 5A is a diagram explaining compression processing when mixdown is performed at an appropriate level.
Figure 5B:
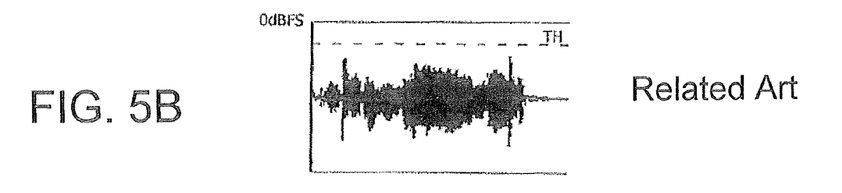
FIG. 5B is a diagram explaining compression processing when mixdown is not performed at an appropriate level.

FIGS. 5A and 5B schematically show compression processing in the mastering process. FIG. 5A illustrates compression (compressor) processing performed when the mixdown is carried out at an appropriate level. In the figures, 0 dBFS is the target level that serves as a reference, and TH is the threshold value for the compression processing. Compression processing is processing in which parts of a signal having a level exceeding the threshold value are compressed by a predetermined ratio while other parts of the signal having a level at or below the threshold value are maintained. Accordingly, when the mixdown is carried out at an appropriate level and the level reaches the threshold value TH as shown in FIG. 5A, the compression processing is meaningful.

On the other hand, FIG. 5B illustrates compression processing performed when the mixdown is carried out at an inappropriate level that is too low. Although decreasing of the mixdown level can be effective in consideration of preventing distortion due to an overly high level, when the level is too low, the level does not reach the threshold value TH such that compression is not executed at all, rendering the compression processing meaningless. This situation can occur similarly when presets are provided. When the mixdown level is lower than the threshold value TH of a selected preset, the compression processing does not function substantially.

SUMMARY

The present invention provides a recording apparatus which can effectively execute compression processing regardless of the level of the audio signal, such as a stereo audio signal obtained by mixing down, and which can thereby carry out the mastering process easily.

The present invention provides a recording apparatus for recording an audio signal, comprising: a peak value detection unit for detecting a first peak value of an audio signal; a threshold value adjustment unit for adjusting, using the detected first peak value, a threshold value for compression processing; and a compression unit for compressing, from among levels of the audio signal, a level that exceeds the adjusted threshold value, and for detecting a second peak value of the compressed audio signal.

According to one embodiment of the present invention, the recording apparatus further comprises a mixdown unit for producing a stereo audio signal from audio signals assigned to respective ones of a plurality of tracks, and the mixdown unit serves as the peak value detection unit and detects the first peak value of the audio signal.

According to another embodiment of the present invention, the recording apparatus further comprises a normalize unit for amplifying, using the detected second peak value, a level of the audio signal that has been processed by the compression unit to a target reference level.

According to a further embodiment of the present invention, the compression unit compresses, from among the levels of the audio signal, the level that exceeds the adjusted threshold value, and simultaneously amplifies, using the detected second peak value, a level of the audio signal that has been processed by the compression unit to a target reference level.

According to a still further embodiment of the present invention, the peak value detection unit comprises a unit for removing, from the audio signal, frequencies at and below a predetermined lower-limit frequency and frequencies at and above a predetermined upper-limit frequency, and a unit for detecting an envelope of the audio signal from which the frequencies at and below the predetermined lower-limit frequency and the frequencies at and above the predetermined upper-limit frequency are removed. Further, the peak value detection unit detects a peak value of the envelope as the first peak value.

According to the present invention, compression processing can be executed effectively regardless of the audio signal level, and therefore a mastering process can be carried out easily. According to the present invention, even when the audio signal level is low, compression processing can be executed reliably, so that the user can be well aware of the effectiveness of the mastering process.

BRIEF DESCRIPTION OF THE DRAWINGS

Preferred embodiments of the present invention will be described in detail based on the following figures, wherein.

DESCRIPTION OF EMBODIMENTS

In the following, an embodiment of the present invention is described by reference to the drawings and by referring to a multi-track recorder as an example of a recording apparatus.

Figure 1:
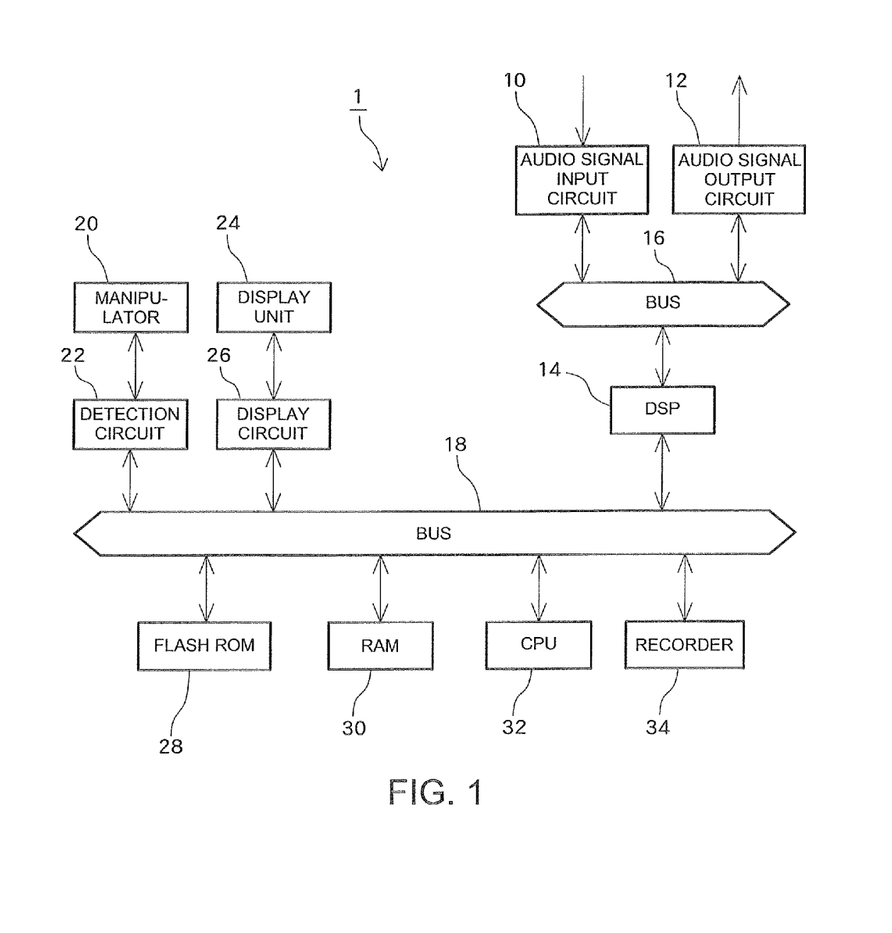
FIG. 1 is a configuration diagram showing a multi-track recorder according to an embodiment of the present invention.

FIG. 1 is a configuration block diagram showing a multi-track recorder 1 according to the present embodiment. An audio signal input circuit 10 has a plurality of input ports, and receives input of audio signals from a plurality of sound sources. Examples of the audio signals include those of a guitar, vocal, and drums. The audio signal input circuit 10 includes an integrated microphone and/or the input ports for receiving input of the audio signals. When both of the integrated microphone and the input ports are provided, the integrated microphone and the input ports are mutually switchable. An audio signal input from the audio signal input circuit 10 is transmitted to a DSP (digital signal processor) 14 via a bus 16.

Under control of a CPU 32, the DSP 14 carries out predetermined digital processing with respect to the audio signals of a plurality of channels supplied from the audio signal input circuit 10. Specifically, the DSP 14 executes a mixdown process, a mastering process, and the like with respect to those signals, and then records the resulting signals in a recorder 34 via a bus 18. A recording medium used in the recorder 34 may be an optical disc such as a CD-R/RW or a DVD-R/RW, a hard disk, a flash memory medium, and the like. The processing performed by the DSP 14 also includes adjustment of pan and volume of each audio signal in response to manipulations of a manipulator 20.

The manipulator 20 is provided on a console surface of the multi-track recorder 1. The manipulator 20 comprises various key switches, selection button, menu button, OK button, pan adjustment knobs, level adjustment knobs, and the like. By manipulating the manipulator 20, a user assigns each audio signal to at least one track among the plurality of tracks. The manipulation state of the manipulator 20 is detected by a detection circuit 22. The detection circuit 22 supplies a manipulation state detection signal representing the manipulation state of the manipulator 20 to the CPU 32 via the bus 18.

The CPU 32 performs centralized control of the overall multi-track recorder. The CPU 32 executes various processes by following programs stored in a flash ROM 28 and using a RAM 30 as a working memory. Specifically, based on a manipulation state detection signal supplied from the detection circuit 22, the CPU 32 assigns each of the audio signals of the plurality of channels to at least one of the plurality of tracks. For example, when there are provided tracks 1 to 8, channel A may be assigned to track 1, channel B may be assigned to track 2, and channel C may be assigned to track 8. Further, the CPU 32 supplies various information to a display circuit 26. The display circuit 26 displays the various information on a display unit 24.

The CPU 32 provides commands to the display circuit 26 for causing display of various menu screens and settings screens in response to manipulations of the manipulator 20 by a user. In accordance with information from the CPU 32, the display circuit 26 displays menu screens and settings screens on the display unit 24.

Further, the CPU 32 provides commands to the display circuit 26 for causing display of the levels of the audio signals assigned to the respective tracks in a format such as a bar graph format (i.e., a level meter). In accordance with information from the CPU 32, the display circuit 26 displays a level meter image on the display unit 24.

Furthermore, in accordance with a manipulation state detection signal supplied from the detection circuit 22, the CPU 32 reads out an audio signal recorded in the recorder 34 and supplies this audio signal to the DSP 14, and the DSP 14 outputs the audio signal to outside via the bus and an audio signal output circuit 12. The audio signal output circuit 12 has various output ports such as analog output ports, digital output ports, and the like.

Since the DSP 14 of the present embodiment performs a mixdown process and a mastering process as described above, the DSP 14 functions as a mixdown processor and a mastering processor. These processes are performed by sequentially reading out a program stored in advance in a program memory and by having the DSP 14 execute the program successively. Instead of the DSP 14, it is of course alternatively possible to provide hardware for performing a mixdown process and hardware for performing a mastering process. In other words, the mixdown process and the mastering process may be executed by means of either hardware or software.

A mixdown process is a process of synthesizing the audio signals of a plurality of channels supplied from the audio signal input circuit 10 into L-channel and R-channel audio signals. The mixdown process is carried out while manipulating the level adjustment knob for each track so as to adjust the levels and the balance, and also while adjusting the overall level. Further, using the pan adjustment knob for each track, each track is localized in stereo in the L- and R-channels. The levels of the L- and R-channels (i.e., stereo meter) are displayed on the display unit 24, and the user adjusts the levels by visually checking the displayed levels.

Figure 2:
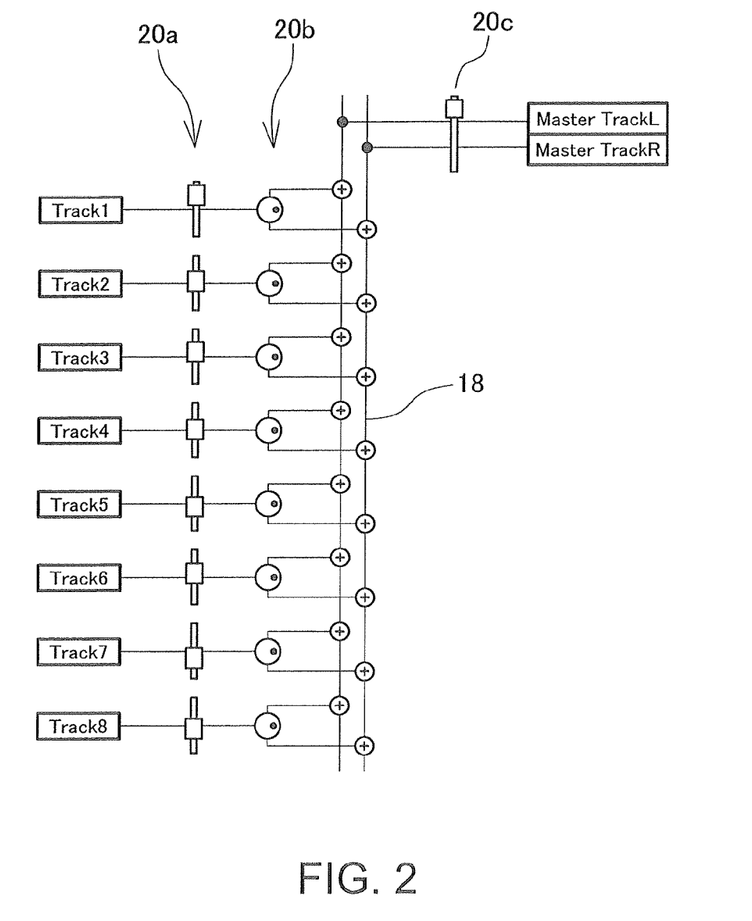
FIG. 2 is a functional block diagram illustrating a mixdown process.

FIG. 2 shows a functional block diagram illustrating a mixdown process. Eight tracks from track 1 to track 8 are each assigned an audio signal. Recording for each track is executed at a level as close to the full scale (0 dBFS) as possible. The level of the audio signal of each track is adjusted by means of a channel fader 20a provided for each channel. Further, using the pan adjustment knob 20b, the L (left) and R (right) levels of each audio signal are adjusted so as to localize the audio signal. The master fader 20c is set to 0 dB, and the audio signals are mixed down into the master track (stereo track) while the overall level is adjusted. Specifically, the user visually checks the stereo meter and carries out the mixdown process at a level as close to the full scale as possible without exceeding the reference level.

A mastering process includes equalizer processing (equalization), compression processing, and normalization processing. The mastering process is started when the user sets a starting point and an ending point of an audio signal that should be mastered, and manipulates a "master recording" button or selects a "master recording" menu. A plurality of sets of threshold value and ratio (i.e., a plurality of presets) for the compression processing in the mastering process are provided in advance, so that the user can select a desired preset. However, when the audio signal resulting from the mixdown process has an inappropriate level that is too low, the audio signal level is lower than the threshold value of the compression processing, such that no meaningful effect can be achieved by the compression processing.

As such, according to the present embodiment, in a mastering process, the peak value of the level of the audio signal is detected, and the compression processing is carried out by automatically adjusting the threshold value for the compression processing adaptively in response to the detected peak value. When the audio signal level is low, its peak value is accordingly small. Upon detection of a peak value, when the peak value is small, in response, the threshold value to be used for the compression processing is automatically adjusted smaller. As a result, among parts of the audio signal, there would be parts that exceed the threshold value, so that effectiveness of the compression processing can be ensured.

Figure 3:
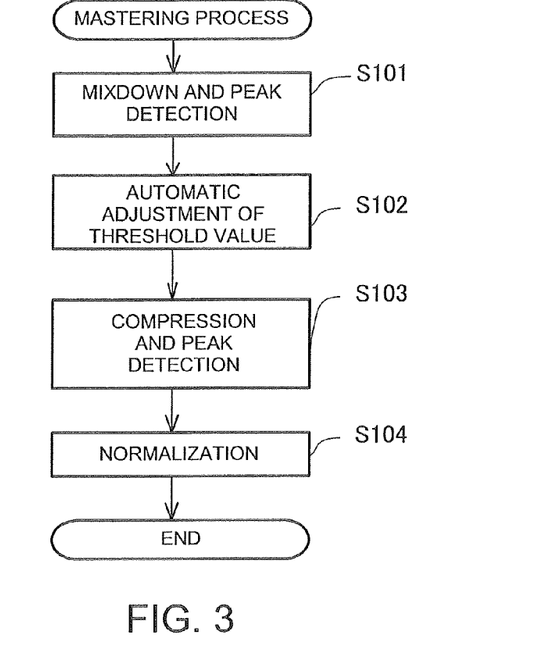
FIG. 3 is a flowchart illustrating a mastering process according to an embodiment of the present invention.

FIG. 3 is a flowchart illustrating the mastering process, which is carried out by the DSP 14. First, in response to an instruction from the user, a mixdown process is performed to synthesize the audio signals of a plurality of channels supplied from the audio signal input circuit 10 into L- and R-channel audio signals (S101). At the same time as performing the mixdown process, a peak value (i.e., first peak value) of the audio signal level is detected. While the peak value can be detected using a known method, the peak detection is preferably carried out by eliminating peak values at unnecessary frequencies or by eliminating any abrupt peak values. Further description in this regard is given further below. The L- and R-channel stereo audio signals that have been subjected to the mixdown process and the peak detection are stored in the RAM 30 or the recorder 34. The peak value is stored in the RAM 30.

Next, when the user instructs "master recording", the DSP 14 performs equalization processing as necessary, and then automatically adjusts, in accordance with the detected peak value (the first peak value), the threshold value to be used for the compression processing (i.e., the threshold value of the preset selected by the user) (S102). According to this step, in response to the peak value of the stereo audio signals being too low, the threshold value for the compression processing is adjusted to be smaller. Specifically, the DSP 14 reads out the peak value that was detected and then stored in the RAM 30 in S101, and compares the peak value with the threshold value for the compression processing, so as to determine whether or not the peak value is smaller than or equal to the threshold value. When a plurality of presets are made available in advance as described above, the threshold value is a threshold value of the preset selected by the user. If the peak value is smaller than or equal to the threshold value, the compression processing would be meaningless because there exists no part to be compressed even if the compression processing is carried out. In order to avoid this situation, the threshold value is adjusted to be smaller in accordance with the peak value. Assuming that the threshold value before adjustment is denoted by TH, the threshold value after adjustment is denoted by THn, and the peak value is denoted by P, the adjustment is made so that TH≥P>THn is satisfied. In one example, THn may have a level that is reduced from the peak value P by a predetermined amount Δ (an arbitrary value decided depending on design and specifications). Meanwhile, if the peak value is greater than or equal to the threshold value, the threshold value does not require adjustment. However, even in that case, if the difference between the peak value and the threshold value is smaller than a predetermined value (an arbitrary value decided depending on design and specifications) and the two values barely differ from each other, the threshold value may be adjusted.

After automatically adjusting the threshold value in accordance with the peak value, the compression processing is carried out using the adjusted threshold value (S103). In other words, from among parts of the audio signal, the parts having levels exceeding the adjusted threshold value are compressed by a predetermined ratio so that the sound pressure of the audio signal becomes enhanced. For example, the ratio is 10:1. As a result of the compression processing, although the parts of the audio signal having levels exceeding the threshold value are compressed and made relatively smaller, the waveform of the original audio signal remains.

Similarly to in the mixdown process, at the same time as performing the compression processing, a peak value (i.e., second peak value) of the compressed audio signal level is detected. The detected peak value is stored in the RAM 30.

Subsequently, with respect to the audio signal obtained after the compression processing, normalization is performed (S104). According to the normalization processing, the compressed audio signal is amplified so that its peak value (the second peak value) corresponds to the target reference level (for example, 0 dBFS). Although processing for detecting the peak value of the audio signal is first carried out in ordinary normalization processing, in the present embodiment, since the peak detection is performed simultaneously with the compression processing executed before the normalization and this detected peak value is used for the normalization, no separate peak value detection needs to be performed in the normalization processing, so that the normalization processing can be speeded up.

The audio signal after being processed as described above is recorded in the recorder 34 as a master data. The master data is read out in response to a reproduction instruction by the user and output from the audio signal output circuit 12. The master data may be converted into WAV format or the like and output to an external personal computer.

According to the present embodiment, a peak value (the first peak value) is detected during the mixdown process, and the compression processing is carried out by automatically adjusting the threshold value in accordance with this peak value. As such, even when the level of the mixed-down audio signal is too low, the compression processing can be executed effectively and the sound pressure of the audio signal can be enhanced. Furthermore, as a peak value (the second peak value) is detected during the compression processing and this peak value is used to perform normalization, efficiency and speed of the overall processing can be increased.

The peak value (the first peak value) detected during the mixdown process and the peak value (the second peak value) detected during the compression process are not necessarily the same. For this reason, in the present embodiment, these peak values are distinguished by being referring to as the first peak value and the second peak value. This naturally does not exclude a situation in which the first peak value and the second peak value become identical as a result.

Figure 4A:
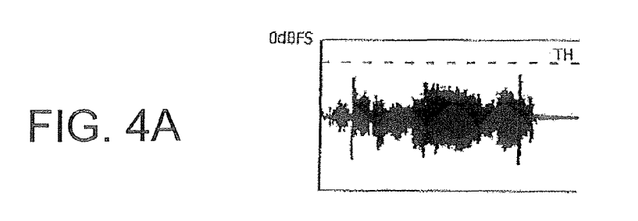
FIG. 4A is a diagram explaining a threshold value before adjustment according to an embodiment of the present invention.

FIG. 4A shows a relationship between a threshold value before adjustment and an audio signal resulting from the mixdown process. In FIG. 4A, since the level of the audio signal is too low and does not reach the threshold value TH, compression would not be executed in this state even if the compression processing is carried out, so that the user cannot be aware of the effects achieved by the mastering process.

Figure 4B:
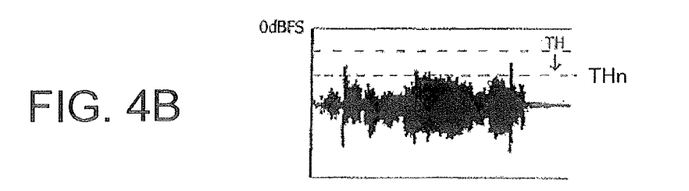
FIG. 4B is a diagram explaining a threshold value after adjustment according to an embodiment of the present invention.

In contrast, FIG. 4B shows a relationship between a threshold value after adjustment and an audio signal resulting from the mixdown process. In FIG. 4B, the threshold value is adjusted to be lower from TH to THn, and it can be seen that the audio signal level reaches the threshold value TH. In this case, from among parts of the audio signal, the parts having levels exceeding the threshold value THn are compressed by a predetermined ratio, so that the user can be very aware of the effectiveness of the mastering process, which is enhancement of the sound pressure.

Next, the peak value detection process during the mixdown process and the peak value detection process during the compression process according to the present embodiment are described. In the present embodiment, the two peak value detection processes are different processes from each other.

Figure 6:
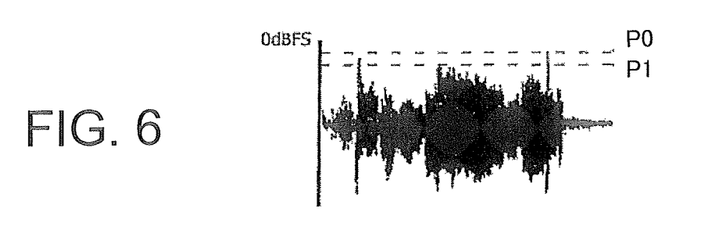
FIG. 6 is a diagram explaining a peak detection process.

FIG. 6 shows a relationship between the level of the stereo audio signal obtained as a result of mixing down and the detected peak. By simply detecting a peak value P0 of the audio signal level, an abrupt peak as shown in the figure may be undesirably detected as the peak value P0. Further, a peak in a primarily unnecessary frequency band, such as frequencies at or below 20 Hz and those at or above 12 kHz, may be undesirably detected as the peak value P0 (the description herein is given assuming that the primarily unnecessary frequency bands of the present embodiment are frequencies at or below 20 Hz and those at or above 12 kHz, although the unnecessary frequency bands differ depending on the specifications and characteristics of the apparatus to which the invention is applied). If the threshold value is automatically adjusted based on such an undesirably detected peak value, effective compression processing cannot be attained. It is therefore preferable to detect a peak that is not abrupt and not located within the unnecessary frequency bands, as a peak value P1.

Figure 7:
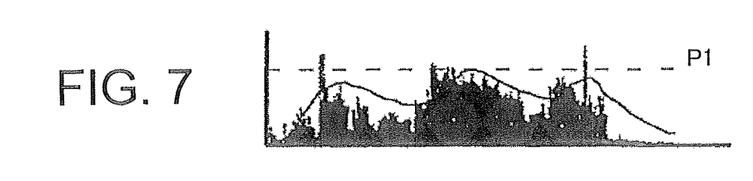
FIG. 7 is a diagram explaining peak detection according to an embodiment of the present invention.

Here, a true peak value P1 can be detected reliably by detecting, as shown in FIG. 7, an envelope of the audio signal obtained as a result of the mixdown, and detecting the peak in this envelope as the peak value P1. An envelope of an audio signal can be acquired by passing the audio signal through a low-pass filter. Before passing the audio signal through this low-pass filter, the unnecessary frequency bands may be removed by means of, for example, a filter that eliminates frequencies at or below 20 Hz and a filter that eliminates frequencies at or above 12 kHz.

Figure 8A:
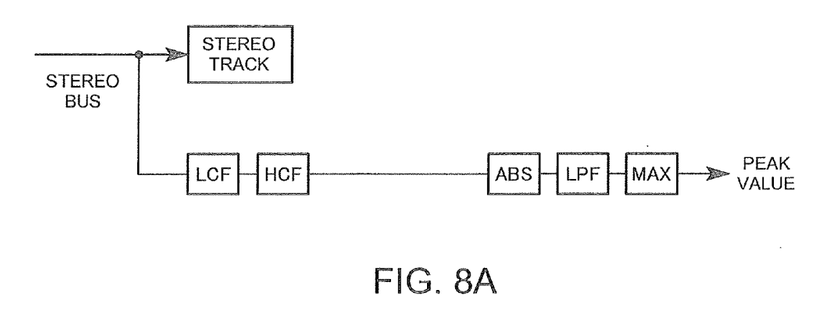
FIG. 8A is a functional block diagram showing a peak detection (in single-band format) performed during a mixdown process.

FIG. 8A is a functional block diagram illustrating a peak value detection performed during the mixdown process, for a case in which the compression processing is to be carried out in a single-band format (i.e., without dividing into respective frequency bands).

A stereo audio signal supplied via the stereo bus 18 is recorded in the recorder 34 as a stereo track. In parallel, the stereo audio signal is processed such that its low-frequency components at or below 20 Hz are removed by a low-cut filter (LCF), and also such that its high-frequency components at or above 12 kHz are removed by a high-cut filter (LCF). Regarding the stereo audio signal from which low-frequency and high-frequency components have been removed, the absolute values are detected using an absolute value detector (ABS), the envelope is detected using a low-pass filter (LPF), and the maximum value is detected using a maximum value detector (MAX) to thereby detect the peak value. While these devices LCF, HCF, ABS, LPF, and MAX are constituted by the DSP 14 in the present embodiment, these devices may alternatively be formed using components separate from the DSP 14. The detected peak value is used for the adjustment of the threshold value for the compression processing. Specifically, magnitude of the detected peak value is compared with that of the threshold value of the preset selected by the user, and the threshold value is automatically adjusted in accordance with the result of the comparison.

Figure 8B:
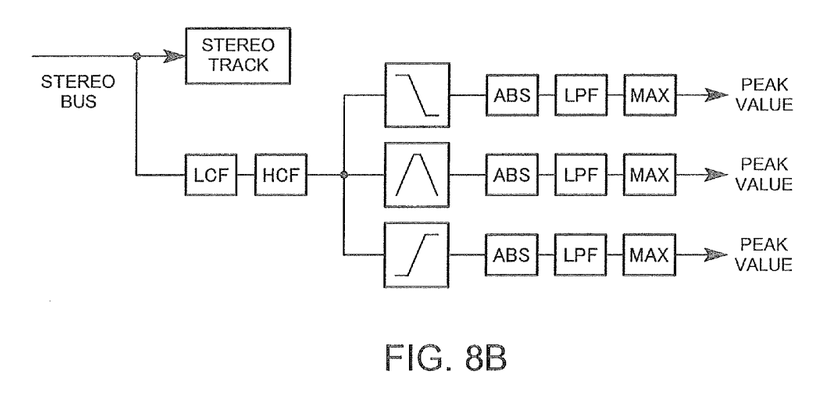
FIG. 8B is a functional block diagram showing peak detection (in multiple-band format) performed during a mixdown process.

FIG. 8B is a functional block diagram illustrating peak value detection performed during the mixdown process, for a case in which the compression processing is to be carried out in a multiple-band format (i.e., by dividing into respective frequency bands).

A stereo audio signal supplied via the stereo bus 18 is recorded in the recorder 34 as a stereo track. In parallel, the stereo audio signal is processed such that, for example, its low-frequency components at or below 20 Hz are removed by a low-cut filter (LCF) and its high-frequency components at or above 12 kHz are removed by a high-cut filter (LCF). The stereo audio signal from which low-frequency and high-frequency components have been removed is divided into three frequency bands by means of a crossover filter. The three divided frequency bands are respectively referred to as the low-frequency band, intermediate-frequency band, and high-frequency band, relative to each other. Regarding each of the frequency bands, absolute values are detected using an absolute value detector (ABS), the envelope is detected using a low-pass filter (LPF), and the maximum value is detected using a maximum value detector (MAX) to thereby detect the peak value. The peak value in the low-frequency band is denoted as peak value L, the peak value in the intermediate-frequency band is denoted as peak value M, and the peak value in the high-frequency band is denoted as peak value H. These peak values are each stored in the RAM 30 and used for the adjustment of the threshold values for the compression processing. Specifically, magnitudes of the detected peak values are compared with those of the low-frequency threshold value, intermediate-frequency threshold value, and high-frequency threshold value of the preset selected by the user, respectively, and the three threshold values are automatically adjusted in accordance with the results of the comparisons.

As described above, unnecessary frequencies are removed from the stereo audio signal resulting from the mixdown process, then the envelope is detected to detect the peak value, which is used for automatically adjusting the threshold value for the compression processing. In this way, the threshold value can be adjusted to an appropriate value without being influenced by abrupt peaks or peaks in unnecessary frequency bands.

Figure 9A:
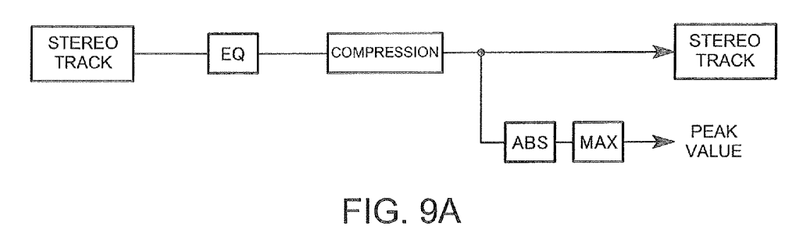
FIG. 9A is a functional block diagram showing peak detection (in single-band format) performed during a compression processing.

FIG. 9A is a functional block diagram illustrating a peak value detection performed during the compression processing, for a case in which the compression processing is carried out in a single-band format.

The stereo audio signal read out from the stereo track of the recorder 34 is subjected to the equalizing processing in an equalizer (EQ), and subsequently, the compression processing is performed using the threshold value that has been adjusted in accordance with the peak value detected during the mixdown process. The compressed stereo audio signal is stored in a stereo track of the recorder 34. In parallel, a peak value of the compressed stereo audio signal is detected. The detected peak value is stored in the RAM 30 for use in the normalization processing. Since the peak value detected during the compression processing is for use in the normalization processing, it is not necessary to perform this detection from an envelope as in the peak detection performed during the mixdown.

Figure 9B:
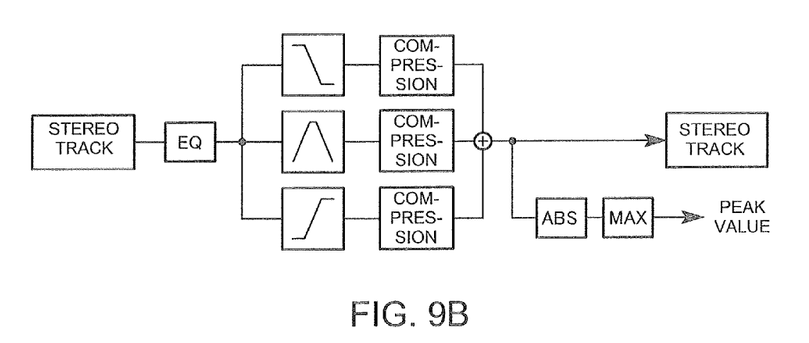
FIG. 9B is a functional block diagram showing peak detection (in multiple-band format) performed during a compression processing.

FIG. 9B is a functional block diagram illustrating peak value detection performed during the compression processing, for a case in which the compression processing is carried out in a multiple-band format (for example, in three bands).

The stereo audio signal read out from the stereo track of the recorder 34 is subjected to the equalizing processing in an equalizer (EQ), and is subsequently divided into the three frequency bands, namely, the low-frequency band, intermediate-frequency band, and high-frequency band, by means of a crossover filter. In each of the frequency bands, the compression processing is performed using a threshold value that has been adjusted in accordance with the corresponding peak value L, M, or H detected in that frequency band during the mixdown process.

Here, since the threshold value for each frequency band is adjusted individually in accordance with the peak value in that frequency band, there may be cases in which the threshold values in all of the frequency bands are adjusted, and also cases in which the threshold value is adjusted in some frequency bands but no threshold value adjustment is made in other frequency bands. For example, assuming that THL denotes a threshold value preset for a low-frequency band and THH denotes a threshold value preset for a high-frequency band, threshold THL would be adjusted to be smaller if "THL≥peak value L" holds true, while threshold THH would be maintained and used for the compression processing if "peak value H≥THH" holds true.

The stereo audio signals obtained by performing the compression processing separately for the three frequency bands are synthesized together and stored in a stereo track of the recorder 34. In parallel, a peak value of the compressed and synthesized stereo audio signal is detected. The detected peak value is stored in the RAM 30 for use in the normalization processing. This peak value detection is performed in the same manner as in the case of a single-band format.

According to the present embodiment, as shown in FIG. 3, the compression processing and peak value detection are performed in S103, and the normalization processing is performed in S104. The normalization processing is carried out off-line, i.e., normalization alone is executed and the normalized audio signal is stored in the recorder 34, and subsequently, the normalized audio signal can be reproduced. Alternatively, it is also possible to carry out the normalization processing on-line, i.e., the processing can be performed as the user listens to the audio signal. In this case, at the same time as performing the compression processing and peak value detection, the normalization processing is executed by computation, and the audio signal obtained as a result of the computation is reproduced so that the user can check by listening.

Figure 10:
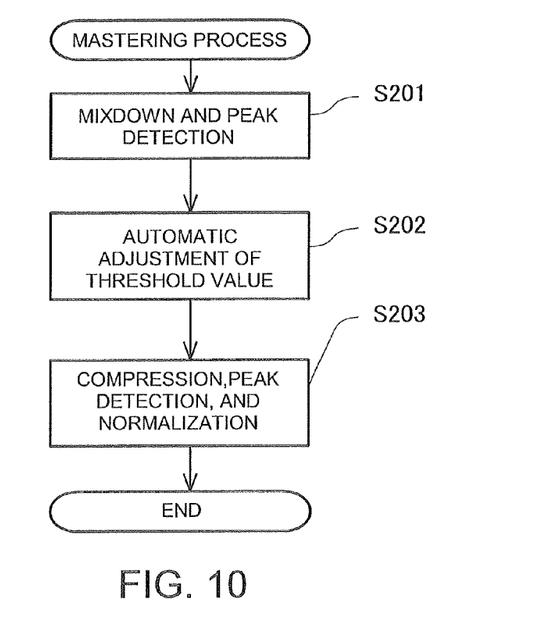
FIG. 10 is a flowchart illustrating a mastering process according to another embodiment of the present invention.

FIG. 10 is a flowchart illustrating a process according to the alternative embodiment, which is executed by the DSP 14. First, in response to an instruction from the user, a mixdown process is performed to synthesize the audio signals of a plurality of channels supplied from the audio signal input circuit 10 into L- and R-channel audio signals (S201). At the same time as performing the mixdown process, a peak value of the audio signal level is detected. The L- and R-channel stereo audio signals that have been subjected to the mixdown process and the peak detection are stored in the RAM 30 or the recorder 34. The peak value is stored in the RAM 30.

Next, when the user instructs "master recording", the DSP 14 performs equalization processing (equalizing) as necessary, and then automatically adjusts the threshold value to be used for the compression processing in accordance with the detected peak value (S202). Specifically, the DSP 14 reads out the peak value that was detected and then stored in the RAM 30 in S201, and compares the peak value with the threshold value for the compression processing so as to determine whether or not the peak value is smaller than or equal to the threshold value. When a plurality of presets are made available in advance, the threshold value is a threshold value of the preset selected by the user. If the peak value is smaller than or equal to the threshold value, the compression processing would be meaningless because there exists no part to be compressed even if the compression processing is carried out. In order to avoid this situation, the threshold value is adjusted to be smaller in accordance with the peak value. Assuming that the threshold value before adjustment is denoted by TH, the threshold value after adjustment is denoted by THn, and the peak value is denoted by P, the adjustment is made so that TH≥P>THn is satisfied.

After automatically adjusting the threshold value in accordance with the peak value, the compression processing is carried out using the adjusted threshold value (S203). In other words, from among parts of the audio signal, the parts having levels exceeding the adjusted threshold value are compressed by a predetermined ratio so that the sound pressure of the audio signal becomes enhanced. At the same time as performing the compression processing, a peak value of the compressed audio signal level is detected. The detected peak value is stored in the RAM 30.

Further, when executing the compression processing, an output level obtained after the compression processing is predicted by calculation, and the audio signal is compressed and amplified so that the peak value of the predicted level corresponds to the target reference level (for example, 0 dBFS). More specifically, from among parts of the stereo audio signal, since the parts having levels exceeding the threshold value TH are to be compressed by a predetermined ratio (denoted as "r"), the level of the audio signal that should be obtained if the audio signal is compressed by the predetermined ratio is calculated, and the peak value of the calculated level is determined. Then, an amplification ratio β for adjusting the calculated peak value to the target reference level is calculated. Subsequently, among the parts of the stereo audio signal obtained by mixing down, the parts below the threshold value are amplified by the ratio β, and the parts exceeding the threshold value TH are compressed and amplified by the ratio β·r. To state it differently, the parts at or below the threshold value are compressed by the ratio β, and the parts exceeding the threshold value TH are compressed by the ratio β·r.

In this way, by simultaneously executing normalization during the compression processing, it is possible to eliminate the need to perform normalization again after completing the compression processing, so that the time required for the mastering process can be reduced. According to necessity, the user may reproduce and listen to the audio signal obtained as a result of the computations, so as to check and confirm the state of the compressed and normalized audio signal.

While a multi-track recorder is referred to as an example for explaining the embodiments of the present invention, the present invention is not limited to this apparatus. The present invention can be applied to an arbitrary recording apparatus that performs compression processing on an audio signal and records the compressed signal on a recording medium.

The invention claimed is:
1. A recording apparatus, comprising:
one or more processors configured to:
  detect a first peak value, the first peak value being a peak level of an audio signal;
  adjust, using the first peak value as a reference, a preset threshold value for a compression process to a value that is less than the first peak value;
  compress the audio signal by the compression process, the compression process including compression of portions of the audio signal that have levels that exceed the adjusted preset threshold value; and
  detect a second peak value for a normalization process, the second peak value being a peak level of the compressed audio signal, the second peak value being detected in parallel with the compression process.

2. The recording apparatus according to claim 1, wherein the audio signal is generated by a mix down process of a plurality of audio signals assigned to a plurality of tracks, the first peak value being detected in parallel with the mix down process.

3. The recording apparatus according to claim 1, wherein the one or more processors are further configured to normalize the compressed audio signal by the normalization process, the normalization process including the compressed audio signal being amplified such that the second peak value corresponds to a target reference level.

4. The recording apparatus according to claim 1, wherein the first peak value is detected by the audio signal being filtered by frequencies at and below a predetermined lower-limit frequency and frequencies at and above a predetermined upper-limit frequency being removed from the audio signal and an envelope of the filtered audio signal being detected, the first peak value being a peak level of the envelope of the filtered audio signal.

5. A method, comprising:
detecting a first peak value, the first peak value being a peak level of an audio signal;
determining whether the first peak value is less than a preset threshold value;
compressing the audio signal by compressing portions of the audio signal that have levels that exceed the preset threshold value when the first peak value is not less than the preset threshold value; and
adjusting the preset threshold value to a value that is lower than the first peak value and compressing the audio signal by compressing portions of the audio signal that have levels that exceed the adjusted preset threshold value when the first peak value is less than the preset threshold value.

6. The method of claim 5, wherein the audio signal is generated by a mix down process, the first peak value being detected in parallel with the mix down process.

7. The method of claim 5, further comprising:
detecting a second peak value, the second peak value being a peak level of a compressed audio signal, the second peak value being detected in parallel with compressing of the audio signal; and
normalizing the compressed audio signal by amplifying the compressed audio signal such that the second peak value corresponds to a target reference value.

8. The method of claim 5, wherein the detecting of the first peak value includes filtering the audio signal by filtering out frequencies below a minimum frequency and filtering out frequencies above a maximum frequency and detecting an envelope of the filtered audio signal, the first peak value being a peak level of the envelope of the filtered audio signal.

* * * * *